June 6, 1950 W. J. HARLEY 2,510,222
MOTORCYCLE FENDER CONSTRUCTION
Filed June 9, 1949

Inventor
WILLIAM J. HARLEY
By Wheeler, Wheeler & Wheeler
Attorneys

Patented June 6, 1950

2,510,222

UNITED STATES PATENT OFFICE 2,510,222

MOTORCYCLE FENDER CONSTRUCTION

William J. Harley, Milwaukee, Wis., assignor to Harley-Davidson Motor Co., Milwaukee, Wis., a corporation of Wisconsin Application June 9, 1949, Serial No. 98,022

6 Claims. (Cl. 280—152.1)

This invention relates to improvements in motorcycle fender construction.

It is the principal object of the invention to provide an improved front fender construction for motorcycles or the like wherein the fender is mounted wholly from a pair of brackets unitary with the fender and which are rigidly secured to the front forks supported from the cycle wheel axle. It is the purpose of the improved construction to eliminate the need for all secondary support bows and to support the fender rigidly in its operative position in a more effective and attractive manner than heretofore.

Although such an improved construction is applicable to any type of forked cycle support, it is of particular utility when used in conjunction with a telescopic fork support, it being desirable to mount the fender in tire enclosing position at a fixed distance from the axle.

It is another object of the invention to provide a fender bracket of extremely simple construction adapted for mass assembly processes whereby assembly time is materially reduced with consequent reductions in the ultimate cost of the manufactured product.

Other objects will be more apparent from an examination of the following disclosure.

Figure 1:
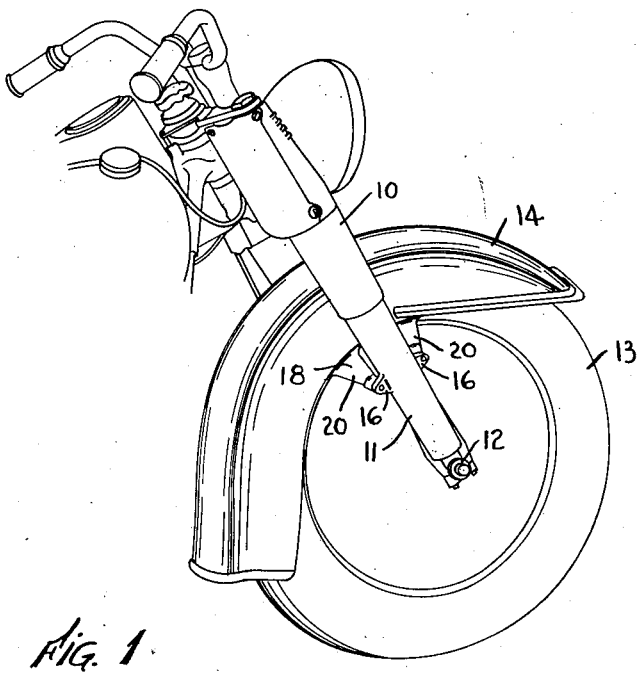
Fig. 1 is a perspective view of the front wheel including the fork elements and mounted fender of a motorcycle embodying the invention.
Figure 3:
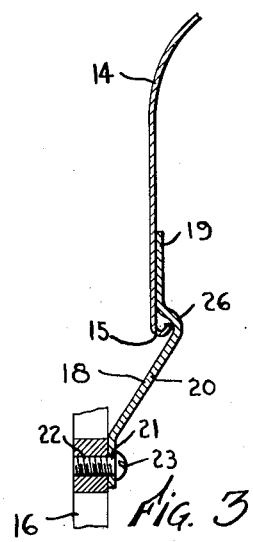
Fig. 3 is a cross sectional view taken along the line 3—3 of Fig. 2.
Figure 2:
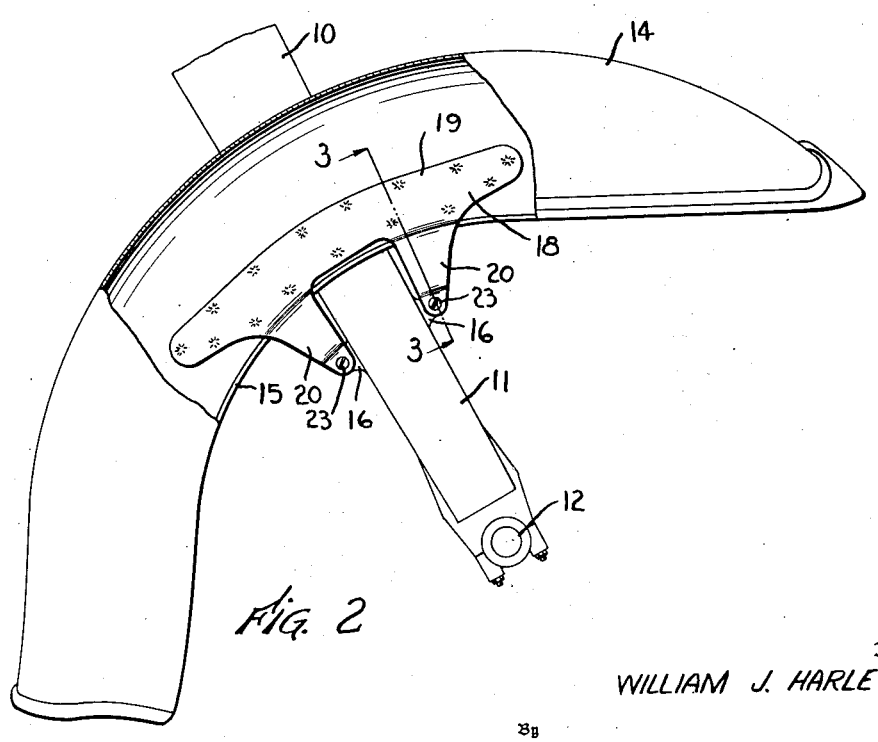
Fig. 2 is a side elevational view of the fender partly in section taken mid-way between the fork legs to show the internal construction of the fender and mounting bracket.

The motorcycle front wheel assembly includes a frame supporting fork comprising paired telescopic legs, each including an upper tube 10 and a lower tube 11 in telescopic association. The lower ends of the respective lower tubes 11 are joined by axle 12 upon which the wheel 13 is rotatable between the fork legs. Between the telescopic legs is the fender 14 provided with rolled marginal edges 15 which serve to reinforce it. The lower tubes 11 are provided at the front and rear sides thereof with integral mounting ears 16 projecting forwardly and rearwardly and which may be cast thereon or welded or otherwise made integral with the tube.

The fender 14 is mounted at a fixed distance from the axle 12 by means of mounting brackets disposed at the respective sides of the fender and shown generally at 18. Each bracket comprises an elongated portion 19, welded or otherwise made unitary with the inner side of the fender 14, and paired arms 20 elbowed at 26 to clear the fender bead 15 and which extend laterally from each side of the fender toward the respective fork legs and which are spaced so as partially to span the respective fork legs. The ends of the arms 20 are apertured at 21, the apertures being in alignment with tapped holes 22 in the fork leg ears 16 when the fender is properly positioned between the fork legs. The fender is securely held in this position by bolts 23 inserted through the arm apertures and then threaded into the tapped ears. In such an arrangement the bolt head faces the wheel and consequently the external surface of the ear presents a neat and smooth appearance.

By disposing the fender mounting bracket arms at both sides of each fork leg a rigid positioning of the fender in partial wheel enclosing position between the fork legs is effected. The entire manner of construction wherein the fender includes the reinforcing marginal bead 15 and wherein the mounting bracket includes the elongated portion 19 made unitary, or substantially so, with the fender and which is offset at 26 to clear the bead 15, and wherein the dual arms 20 are rigidly positioned at either side of the respective fork legs, presents an unusually compact, rigid and attractive fender mount assembly. No support other than the bracket is required to firmly position the fender in the indicated position. Furthermore, by mounting the fender on the tube 11 in fixed relationship to the wheel axle 12, telescopic movement of the tube 11 respecting the tube 10 has no effect on the clearance between the wheel and the fender, such clearance always remaining the same by virtue of the aforesaid construction.

I claim:

1. As a new article of manufacture, a bracket adapted to mount a fender between cycle fork legs having mounting ears, said bracket comprising an elongated portion adapted for unitary connection with the inner surface of the fender, and spaced arms extending from such portion and engageable with the respective fork leg mounting ears, the space between said arms being such that the arms are disposed forwardly and rearwardly of the respective fork legs.

2. The bracket of claim 1 having an offset portion to clear the rolled edge of the fender when positioned at the undersurface thereof.

3. In a cycle the combination with a fork having legs for supporting the cycle from the axle of a wheel rotatable between said legs, said legs having fore and aft mountings, and a fender disposed between the legs and partly enclosing said wheel, of a bracket rigidly connected to the fender and having spaced arms extending toward respective fork leg mountings, one of said arms being fixed to one of said leg mountings and the other arm being fixed to the other of said mountings.

4. The device of claim 3 wherein the said mountings comprise ears disposed at opposite sides of said legs longitudinally of the fender and the bracket arms are spaced to clear the fork leg.

5. The device of claim 4 wherein the ears are respectively tapped and the bracket arms are provided with apertures aligned with said taps when the fender is properly positioned, and wherein the connection therebetween comprises a bolt extending through said aperture and into said tapped ear, the head of said bolt being disposed interiorly of the fork leg.

6. In a cycle, the combination with spaced fork legs adapted to span a wheel rotatable therebetween and having longitudinally telescoping sections, and paired mounting ears having faces parallel with the wheel and oppositely disposed on corresponding sections of each leg at a fixed distance from the axle of said wheel, and a fender between the fork legs and partially enclosing said wheel, of a bracket having a portion unitary with the fender and having pairs of spaced arms extending outwardly at each side of the fender, the space between said arms affording clearance for the fork leg, the ends of said arms being secured to said ears at the inner faces thereof.

WILLIAM J. HARLEY.

No references cited.